US011305585B2

(12) United States Patent
Kuwayama (10) Patent No.: US 11,305,585 B2
(45) Date of Patent: Apr. 19, 2022

(54) PNEUMATIC TIRE

(71) Applicant: BRIDGESTONE CORPORATION, Tokyo (JP)

(72) Inventor: Isao Kuwayama, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 57 days.

(21) Appl. No.: 16/498,778

(22) PCT Filed: Dec. 22, 2017

(86) PCT No.: PCT/JP2017/046257
§ 371 (c)(1),
(2) Date: Sep. 27, 2019

(87) PCT Pub. No.: WO2018/179636
PCT Pub. Date: Oct. 4, 2018

(65) Prior Publication Data
US 2020/0198402 A1    Jun. 25, 2020

(30) Foreign Application Priority Data

Mar. 30, 2017   (JP) .............................. JP2017-069095

(51) Int. Cl.
*B60C 9/22*       (2006.01)
*B60C 9/30*       (2006.01)
*B60C 9/20*       (2006.01)
(52) U.S. Cl.
CPC ................. *B60C 9/22* (2013.01); *B60C 9/30* (2013.01); *B60C 2009/208* (2013.01); *B60C 2009/2252* (2013.01)

(58) Field of Classification Search
CPC ........... B60C 9/20; B60C 9/22; B60C 9/2204; B60C 2009/2029; B60C 2009/2048;
(Continued)

(56) References Cited

U.S. PATENT DOCUMENTS 4,745,956 A * 5/1988 Yagi ...................... B60C 9/2009
152/527
4,957,151 A    9/1990 Takehara
(Continued)

FOREIGN PATENT DOCUMENTS

CN    1708415 A    12/2005
CN    1723135 A    1/2006
(Continued)

OTHER PUBLICATIONS

Machine translation of JP 2011-162023, 2011.*
(Continued)

*Primary Examiner* — Justin R Fischer
(74) *Attorney, Agent, or Firm* — Sughrue Mion, PLLC (57) ABSTRACT

A pneumatic tire comprising a carcass 12, at least one inclined belt layer 13, at least one first circumferential cord layer 14 arranged inward in the tire radial direction of the inclined belt layer 13, a tread 16 arranged outward in the tire radial direction of the inclined belt layer 13, and a second circumferential cord layer 15 which is arranged outward in the tire radial direction so as to cover a tire width direction end of the inclined belt layer 13, and where X is defined as $X = Y \times n \times m \times d$, Y is the Young's modulus (GPa) of the cord, n is the number of cords implanted (cords/50 mm), d is the cord diameter (mm), and m is the number of the first circumferential cord layers 14, X is smaller than X of the first circumferential cord layer 14.

10 Claims, 3 Drawing Sheets

(58) Field of Classification Search
CPC .... B60C 2009/2054; B60C 2009/2074; B60C 2009/2087; B60C 2009/2214; B60C 2009/2228; B60C 2009/2219; B60C 2009/2223; B60C 2200/065
See application file for complete search history.

(56) References Cited

U.S. PATENT DOCUMENTS

| | | | | |
|---|---|---|---|---|
| 5,261,474 | A | * | 11/1993 | Lobb ................. B60C 3/04 152/454 |
| 5,373,886 | A | * | 12/1994 | Yamaguchi ........ B60C 9/2204 152/526 |
| 5,529,105 | A | * | 6/1996 | Hayashi .............. B60C 9/2009 152/454 |
| 6,588,472 | B2 | | 7/2003 | Pirotte |
| 7,299,843 | B2 | | 11/2007 | Osborne et al. |
| 8,555,942 | B2 | | 10/2013 | Cluzel |
| 10,836,213 | B2 | | 11/2020 | Kuwayama |
| 2004/0108037 | A1 | | 6/2004 | Osborne et al. |
| 2005/0269008 | A1 | | 12/2005 | Takagi |
| 2006/0266455 | A1 | | 11/2006 | Nagai |
| 2014/0261952 | A1 | | 9/2014 | Tanaka |
| 2015/0122392 | A1 | | 5/2015 | Kozuki |
| 2017/0028788 | A1 | | 2/2017 | Kuwayama et al. |

FOREIGN PATENT DOCUMENTS

| | | | |
|---|---|---|---|
| CN | 1953879 | A | 4/2007 |
| CN | 104044403 | A | 9/2014 |
| CN | 105682940 | A | 6/2016 |
| CN | 106232383 | A | 12/2016 |
| EP | 0 295 898 | A1 | 12/1988 |
| EP | 0 346 106 | A1 | 12/1989 |
| EP | 573237 | * | 12/1993 |
| EP | 0573237 | A1 | 12/1993 |
| EP | 1179441 | A1 | 2/2002 |
| JP | 5-116504 | A | 5/1993 |
| JP | 6-1110 | A | 1/1994 |
| JP | 2002-337510 | A | 11/2002 |
| JP | 2004-34907 | A | 2/2004 |
| JP | 2006-193093 | A | 7/2006 |
| JP | 2007-313944 | * | 12/2007 |
| JP | 2011-162023 | * | 8/2011 |
| JP | 2017-121868 | A | 7/2017 |
| WO | 2004/041554 | A1 | 5/2004 |
| WO | 2013/161296 | A1 | 10/2013 |
| WO | 2014065298 | A1 | 5/2014 |

OTHER PUBLICATIONS

Machine translation of JP 2007-313944, 2007.*
International Preliminary Report on Patentability dated Oct. 1, 2019 from the International Bureau in Machine application No. PCT/JP2017/046257.
Search Report dated Jan. 6, 2021 from the China National Intellectual Property Administration in CN Application No. 201780089115.4.
International Search Report for PCT/JP2017/046257 dated Mar. 27, 2018 [PCT/ISA/210].
Communication dated Nov. 6, 2020 by the European Patent Office in application No. 17903895.5.
Search Report dated Jun. 4, 2021, from the China National Intellectual Property Administration in application No. 201780089115.4.
Jianmin Ge et al., "Automotive Acoustics", Tongji University Press, First Edition, 2013, pp. 55-61 (9 pages total).
Decision of Rejection dated Sep. 28, 2021, issued by the Chinese Patent Office in the corresponding Chinese patent application 201780089115.4.

* cited by examiner

PNEUMATIC TIRE

CROSS REFERENCE TO RELATED APPLICATIONS

This application is a National Stage of International Application No. PCT/JP2017/046257, filed on Dec. 22, 2017, which claims priority from Japanese Patent Application No. 2017-069095, filed on Mar. 30, 2017.

TECHNICAL FIELD

The present disclosure relates to a pneumatic tire.

BACKGROUND

Tire noise generated by rolling tires while driving a motor vehicle is considered to be an aspect of tire performance, and various improvements for improving the tire performance have been considered. One of the factors that generate tire noise is the noise emitted by vibration of the tread portion.

Additionally, in recent years, the reduction of the weight of the tire has been attempted in order to reduce the rolling resistance of the tire, but along with the reduction in weight, the vibration damping property in the rolling tire is reduced, and the noise emission emitted from the tire tends to increase.

For example, a pneumatic tire (refer to WO2013/161296 (PTL 1) which improves the noise performance while maintaining the steering stability and the rolling resistance performance has been proposed as a means for reducing the noise emission.

CITATION LIST

Patent Literature

PTL 1: WO2013/161296

SUMMARY

Technical Problem

Under such circumstances, for example, even when the reduction of the rolling resistance of the tire was achieved by reducing the weight of the tire, a tire capable of more effectively suppressing the noise emission due to the vibration of the tread portion has been desired.

It would thus be helpful to provide a pneumatic tire in which the rolling resistance is reduced while the braking and driving performances are improved.

Solution to Problem

To obtain the aforementioned object, a pneumatic tire according to the present disclosure comprises a carcass toroidally extending between a pair of bead portions, at least one inclined belt layer which is arranged outward in the tire radial direction of a crown portion of the carcass through a tire equator and having a cord having an inclination angle of 30° or more with respect to the tire circumferential direction, wherein the tire comprises a tread arranged outward in the tire radial direction of the inclined belt layer, and at least one first circumferential cord layer arranged inward in the tire radial direction of the inclined belt layer and having a cord extending along the tire circumferential direction, and a second circumferential cord layer which is arranged outward in the tire radial direction so as to cover a tire width direction end of the inclined belt layer, having a cord extending along the tire circumferential direction, and where X is defined as $X = Y \times n \times m \times d$, Y is the Young's modulus (GPa) of the cord, n is the number of cords implanted (cords/50 mm), m is the number of circumferential cord layers, and d is the cord diameter (mm), X is smaller than X of the first circumferential cord layer.

The aforementioned inclined belt layer is a belt layer having a cord extending inclined relative to the tire circumferential direction, and the circumferential cord layer is a layer having a cord extending along the tire circumferential direction. Herein, the state "extending along the tire circumferential direction" includes the case when the cord is parallel to the tire circumferential direction and the case when the cord is somewhat inclined with respect to the tire circumferential direction (the case when the angle with respect to the tire circumferential direction is approximately 5° or less).

In the description, the above-mentioned width in the tire width direction and the like, unless stated otherwise, shall be measured by mounting a tire on an applicable rim, filling the prescribed internal pressure, and under no load.

The "applicable rim" is an approved rim ("measuring rim" in the ETRTO Standards Manual and "design rim" in the TRA Year Book) prescribed in the following standards in accordance with a tire size, the "prescribed internal pressure" is the air pressure prescribed in the following standards corresponding to the maximum load capability, and the "maximum load capability" is the maximum mass which is allowed to be loaded on a tire by the following standards. Moreover, the standard is an effective industrial standard in areas where tires are produced or used, as described in the Japan Automobile Tyre Manufacturers Association (JATMA) Year Book in Japan, the European Tyre and Rim Technical Organisation (ETRTO) Standards Manual in Europe, or the Tire and Rim Association (TRA) Year Book in the United States.

Advantageous Effect

The present disclosure can provide a pneumatic tire in which the rolling resistance is reduced while the braking and driving performances are improved.

BRIEF DESCRIPTION OF THE DRAWINGS

In the accompanying drawings.

DETAILED DESCRIPTION

An embodiment of the present disclosure will be described below using the drawings in accordance with need.

First Embodiment

Figure 1A:
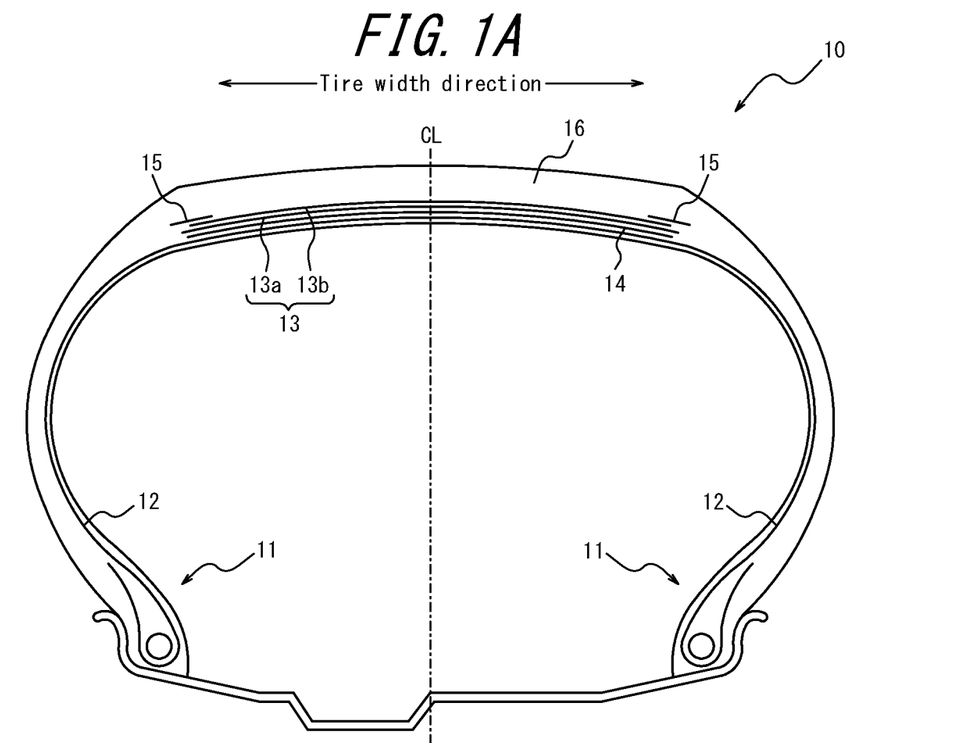
FIG. 1A is a schematic view of a pneumatic tire according to a first embodiment of the present disclosure and is a cross-sectional view in the tire width direction of the whole tire.
Figure 1B:
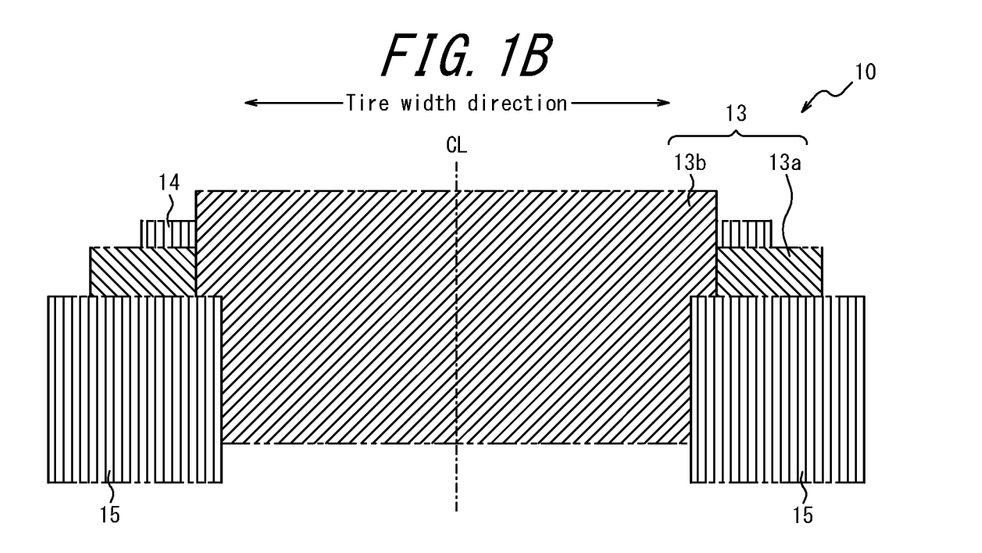
FIG. 1B is a plan view of the layer structure in the tread portion of FIG. 1A.

As illustrated in FIG. 1, a pneumatic tire 10 according to a first embodiment of the present disclosure (hereinafter, also referred to simply as the "tire") comprises a carcass 12 toroidally extending between a pair of bead portions 11, an inclined belt layer 13 which is arranged outward in the tire radial direction of a crown portion of the carcass 12, a first circumferential cord layer 14 arranged inward in the tire radial direction of the inclined belt layer 13, a second circumferential cord layer (layered layer) 15 arranged outward in the tire radial direction so as to cover a tire width direction end of the inclined belt layer 13, and a tread 16 arranged outward in the tire radial direction of the inclined belt layer 13 (refer to FIG. 1A). The pneumatic tire 10 is used by mounting on a motor vehicle, and is particularly suitable as the pneumatic tire for passenger vehicles.

The inclined belt layer 13 is comprised of at least one layer having a cord inclined with respect to the tire circumferential direction and arranged through a tire equator CL, and in the present embodiment, two layers of a wide-width inclined belt layer 13a having a relatively wide width in the tire width direction and a narrow-width inclined belt layer 13b having a relatively narrow width in the tire width direction. Herein, it is preferable that at least the tire width direction center of the wide-width inclined belt layer 13a coincides with the tire equator CL, and in the present embodiment, the tire width direction centers of the wide-width inclined belt layer 13a and the narrow-width inclined belt layer 13b coincide with the tire equator CL.

The width of the maximum width inclined belt layer (in the present embodiment, the wide-width inclined belt layer 13a) which has the widest width of the inclined belt layer 13 is set to 90% to 115% of the width in the tire width direction (tread width) of the tread 16, preferably 100% to 105% (in the present embodiment, 105%).

A metal cord and in particular, a steel cord can be used as the material of the cord of the inclined belt layer 13, but it is also possible to use an organic fiber cord (in the present embodiment, a steel cord). The steel cord may include steel as a main component, and can also contain various micro inclusions such as carbon, manganese, silicon, phosphorous, sulfur, copper, and chromium. Further, a monofilament cord and cords obtained by twisting a plurality of filaments can be used, and various designs may be adopted for the twist structure, which may be different in, for example, sectional structure, twist pitch, twist direction, and/or distance of adjacent filaments. Furthermore, cords obtained by twisting filaments of different materials may also be used, which may employ various twist structures such as single twist, layer twist, and multi twist without being limited to any particular sectional structure.

The inclination angle of the cord of the inclined belt layer 13 with respect to the tire circumferential direction is 30° to 85°, and preferably 50° to 75°. If the inclination angle of the cord of the inclined belt layer 13 with respect to the tire circumferential direction is less than 30°, the rigidity with respect to the tire width direction decreases, thus, the steering stability especially upon cornering cannot be adequately obtained, and shearing deformation of the rubber between layers increases, and accordingly, the rolling resistance performance deteriorates. Further, the steering stability and the rolling resistance performance can be maintained at a high level by setting the inclination angle of the cord of the inclined belt layer 13 with respect to the tire circumferential direction to 50° or more.

The number of cords implanted is in the range of, for example, 20 to 60 cords/50 mm, but it is not limited to this range. Further, the wide-width inclined belt layer 13a and the narrow-width inclined belt layer 13b may have the same or a different number of such cords.

The first circumferential cord layer 14 is provided with at least one layer on the inner side in the tire radial direction relative to the inclined belt layer 13, and having a cord extending along the tire circumferential direction, and in the present embodiment, only one layer is provided. In this way, the neutral axis of bending deformation moves from the surface of the tread 16 to the inner side in the tire radial direction by arranging (internalizing) the first circumferential cord layer 14 on the inner side in the tire radial direction relative to the inclined belt layer 13. Therefore, the shear force of the tread portion becomes higher, and the driving performance improves.

The first circumferential cord layer 14 preferably has a high rigidity, and more specifically, comprises a rubberized layer of cords extending in the tire circumferential direction, and preferably satisfies $1500 \geq X \geq 750$ where X is defined as $X = Y \times n \times m \times d$, Y is the Young's modulus (GPa) of the cord, n is the number of cords implanted (cords/50 mm), d is the cord diameter (mm), and m is the number of first circumferential cord layers 14.

Note that, the cord diameter d is preferably 0.5 to 1.2 mm.

The width in the tire width direction of the first circumferential cord layer 14 is preferably 90% to 110% of the width in the tire width direction of the maximum width inclined belt layer (in the present embodiment, the wide-width inclined belt layer 13a).

The first circumferential cord layer 14 occupies almost the entire region of the tread 16 in the tire width direction, and the tire width direction end of the first circumferential cord layer 14 is preferably arranged outward in the width direction relative to the tire width direction end of the narrow-width inclined belt layer 13b, and on the inner side in the width direction relative to the tire width direction end of the wide-width inclined belt layer 13a.

Further, typical examples of the various materials which may be adopted as the cord material of the first circumferential cord layer 14 include polyethylene terephthalate (PET), aramid, steel and the like. In terms of weight reduction, an organic fiber cord is particularly preferable.

The cord may use a monofilament cord, cords obtained by twisting a plurality of filaments, and furthermore, hybrid cords obtained by twisting filaments of different materials. The number of cords implanted is set to a range of 20 to 60 cords/50 mm, but it is not limited to this range.

The first circumferential cord layer 14 is preferably formed of a cord having the same type of material over the entire cord layer.

Further, from the production standpoint, it is particularly advantageous to configure the first circumferential cord layer 14 as a spiral layer, but the layer may be formed by spirally winding a striped cord in which a plurality of core wires arranged in parallel with each other on a plane are bundled together by a wrapping wire with the parallel arrangement being maintained.

A second circumferential cord layer 15 has a cord extending along the tire circumferential direction, and is arranged outward in the tire radial direction so as to cover both ends in the tire width direction of the maximum width inclined belt layer (in the present embodiment, the wide-width inclined belt layer 13a) at least from the outer side in the tire radial direction (in the present embodiment, provided on the outer side of the wide-width inclined belt layer 13a), and the width in the tire width direction is preferably 20 to 30 mm.

Note that, when the inclined belt layer 13 comprises the two layers of the maximum width inclined belt layer (in the present embodiment, the wide-width inclined belt layer 13a) and the inclined belt layer (in the present embodiment, the narrow-width inclined belt layer 13b) having a width in the tire width direction 90% to 100% of the maximum width inclined belt layer (in the present embodiment, the wide-width inclined belt layer 13a), both ends of the two layers are preferably covered with the second circumferential cord layer 15.

The durability of the ends of the inclined belt layer 13 can be improved by providing the second circumferential cord layer 15 covering the inclined belt layer 13.

The modulus of elasticity of the cord of the second circumferential cord layer 15 is set to be smaller than the modulus of elasticity of the cord of the first circumferential cord layer 14 (second circumferential cord layer 15<first circumferential cord layer 14), and in the present embodiment, is set to 50% to 5%, preferably 25% or less, with respect to the modulus of elasticity of the cord of the first circumferential cord layer 14 (5%≤modulus of elasticity of the cord of the second circumferential cord layer 15/modulus of elasticity of the cord of the first circumferential cord layer 14≤50%). The durability of the ends of the inclined belt layer can be improved by setting as such.

The modulus of elasticity of the aforementioned cord is defined by $X = Y \times n \times m \times d$ where Y is the Young's modulus (GPa) of the cord, n is the number of cords implanted (cords/50 mm), the m layer is the first circumferential cord layer 14, and d is the cord diameter (mm), and when compared by X, X of the second circumferential cord layer 15 is smaller than X of the first circumferential cord layer 14, i.e., is 50% or less of X of the first circumferential cord layer 14. When the modulus of elasticity of the cord of the second circumferential cord layer 15 is too large compared to the modulus of elasticity of the cord of the first circumferential cord layer 14, the strain on the tread rubber at the ends of the second circumferential cord layer 15 becomes large, which is disadvantageous for the improvement of the rolling resistance performance.

Typical examples of the various materials which may be adopted as the cord material of the second circumferential cord layer 15 include nylon. In terms of weight reduction, an organic fiber cord is particularly preferable.

The cord may use a monofilament cord, cords obtained by twisting a plurality of filaments, and furthermore, hybrid cords obtained by twisting filaments of different materials. The number of cords implanted is set to a range of 20 to 60 cords/50 mm, but it is not limited to this range.

Further, from the production standpoint, it is particularly advantageous to configure the second circumferential cord layer 15 as a spiral layer.

The pattern of the tread 16 may be either of a pattern symmetrical in the tire width direction about the tire equator CL or an asymmetric pattern. The negative ratio in the ground contact width of the tread 16 can be set to, for example, 30% or less. When a circumferential main groove is provided in the tread 16, 2 to 4 grooves are preferable, and the groove width of the circumferential main groove is preferably in the range of about 4 to 10 mm. Note that, there does not have to be a circumferential main groove, and it may be a rib-like land portion or a block-like land portion.

The tread rubber which configures the tread 16 may be formed by a CAP/BASE structure, having a plurality of different types of rubber layers in the tire radial direction. The plurality of rubber layers may be different in tangent loss, modulus, hardness, glass transition temperature, material, or the like. Further, the ratio of the thickness in the tire width direction of the plurality of rubber layers may vary in the tire width direction. Moreover, for example, a rubber layer different from its surroundings may be provided only at the circumferential main groove bottom.

Further, the tread rubber may be formed of a divided tread structure consisting of a plurality of different types of rubber layers in the tire width direction. The plurality of rubber layers may be different in tangent loss, modulus, hardness, glass transition temperature, material, or the like. Further, the ratio of the length in the tire width direction of the plurality of rubber layers in the tire width direction may vary in the tire radial direction. Further, a rubber layer different from its surroundings may be provided only in a limited region such as near the circumferential main groove, near the tread edge, on the shoulder land portion, or on the center land portion.

Various structures in the pneumatic tire can be adopted in a carcass line which is an extended ring portion of the carcass 12 in the tire widthwise section, for example, the maximum width position of the carcass in the tire radial direction may be close to the bead portion side or may be close to the tread side. As an example, the maximum width position of the carcass may be in a range of 50% to 90%, in a tire height ratio, on the outer side in the tire radial direction from the bead base portion. The number of cords of the carcass implanted can also adopt various structures in the pneumatic tire, and for example, is preferably 20 to 60 cords/50 mm, but it is not limited to this range. Further, the cord arrangement in the carcass may be a bias structure or may be a radial structure (in the present embodiment, a radial structure is adopted).

A carcass folded-up portion in which the carcass 12 folds up the bead core of the bead portion 11 can also adopt various structures in the pneumatic tire, for example, a folded-up end of the carcass 12 can be arranged on the inner side in the tire radial direction relative to the bead filler end, and further, the carcass folded-up end can be stretched to the outer side in the tire radial direction relative to the bead filler end and the tire maximum width position, and can be stretched, in some cases, to the inner side in the tire width direction relative to the tire width direction end of the belt layer. Furthermore, when the carcass 12 is comprised of a plurality of carcass layers, the tire radial direction positions of the carcass folded-up ends can be different. Further, the carcass folded-up portion may not be present in the first place, and instead, the carcass may adopt a structure sandwiched between a plurality of bead core members or wound around the bead core.

In the tire side portion, the tire maximum width position may be in a range of 50% to 90%, in a tire height ratio, on the outer side in the tire radial direction from the bead base portion, and furthermore, can also be a structure having a rim guard.

Further, a bead filler-less structure without a bead filler can also be used.

The bead core can adopt various structures in the pneumatic tire such as a circular shape and a polygonal shape, and further, as stated above, other than the structure in which the carcass is wound around the bead core, a structure in which the bead core is divided so as to sandwich the carcass by a plurality of bead core members is possible. Further, in order to reinforce the bead core surroundings, a rubber layer, a cord layer and the like can be provided in the bead portion for the purpose of reinforcement. Such additional members can be provided in various positions relative to the carcass and the bead filler.

The air permeation coefficient of the rubber composition constituting an inner liner arranged on the tire inner surface is preferably set to $1.0 \times 10^{-14}$ cc·cm/(cm$^2$·s·cm Hg) to $6.5 \times 10^{-10}$ cc·cm/(c$^2$·s·cm Hg). For example, it is preferable that the inner liner is a rubber layer mainly made of butyl rubber (in the present embodiment, butyl rubber). Note that, in addition to the rubber layer mainly made of butyl rubber, the inner liner may be formed with a film layer mainly made of resin.

Further, the tire inner surface may be provided with a porous member (a sponge or the like), or subjected to electrostatic flocking processing, for reducing cavity resonance noise, or provided with a sealant member for preventing air leakage upon puncture.

Further, the pneumatic tire may be a side-reinforced run-flat tire including a reinforcing rubber having a crescent-shaped cross section in the tire side portion.

In the pneumatic tire 10 of the present embodiment, the inclined belt layer 13, the first circumferential cord layer 14 and the second circumferential cord layer 15 are arranged so as to be symmetrical with respect to the tire equator CL in the tire width direction (refer to FIG. 1). Note that, at least one of the bead filler, the carcass folded-up end portion, and the outer shape of the tire side portion may be arranged asymmetrically.

Second Embodiment

Figure 2A:
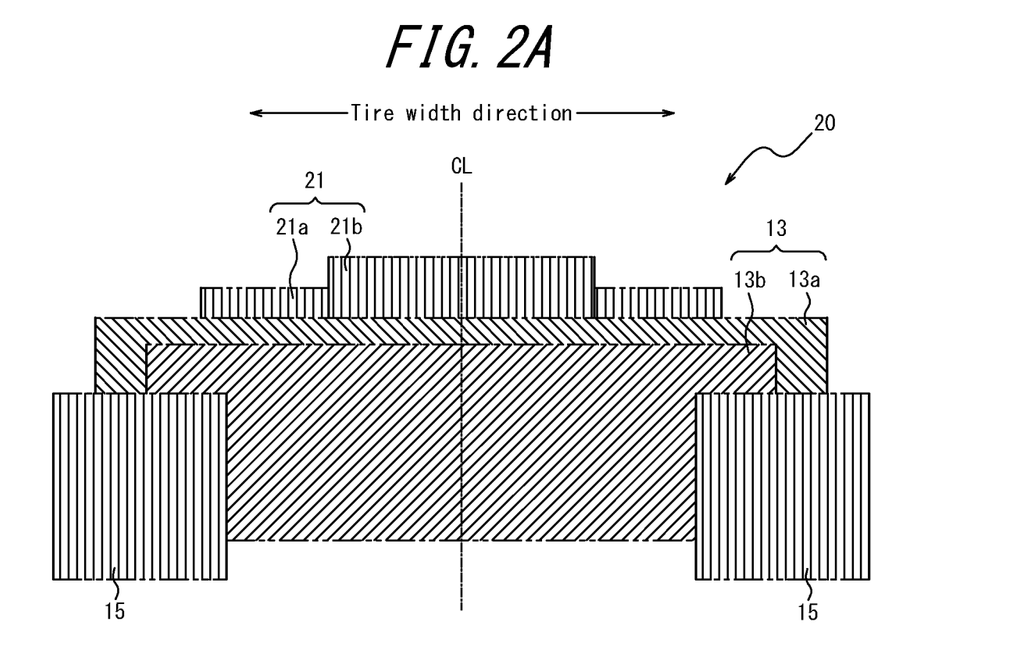
FIG. 2A is a schematic view of a pneumatic tire according to a second embodiment of the present disclosure and is a plan view of the layer structure in the tread portion.

A pneumatic tire 20 according to a second embodiment of the present disclosure, other than the first circumferential cord layer 14 being constructed by two circumferential cord layers 21a, 21b having different widths in the tire width direction, has the same structure and operation as the pneumatic tire 10 according to the aforementioned first embodiment.

As illustrated in FIG. 2A, in the present embodiment, the pneumatic tire 20 is arranged inward in the tire radial direction of the inclined belt layer 13, constructed from the two circumferential cord layers 21a, 21b having different widths in the tire width direction, i.e., a wide-width circumferential cord layer 21a having a relatively wide width in the tire width direction, a narrow-width circumferential cord layer 21b having a relatively narrow width in the tire width direction, and the wide-width circumferential cord layer 21a is arranged on the lower side in the tire radial direction, and the narrow-width circumferential cord layer 21b is arranged on the upper side in the tire radial direction.

In the present embodiment, the narrow-width circumferential cord layer 21b has a width in the tire width direction which is about 0.5 times the width in the tire width direction of the wide-width circumferential cord layer 21a which is also the maximum width in the tire width direction of the circumferential cord layer 21, and the wide-width circumferential cord layer 21a and the narrow-width circumferential cord layer 21b both have their tire width direction centers arranged at the tire equator CL (refer to FIG. 2A). Therefore, the circumferential cord layer 21 has a center region which is the center portion of the width in the tire width direction which includes at least the tire equator CL as a two layer structure of the wide-width circumferential cord layer 21a and the narrow-width circumferential cord layer 21b, and makes the rigidity in the tire circumferential direction of any portion of the center region higher than the rigidity in the tire circumferential direction of any portion of both shoulder regions adjacent to the center region.

Namely, a first circumferential cord layer 21 has a high-rigidity region (in the present embodiment, the region in which the wide-width circumferential cord layer 21a and the narrow-width circumferential cord layer 21b overlap with each other) which includes the tire equator CL and in which the rigidity in the tire circumferential direction per unit width in the tire width direction is high, and a low-rigidity region (in the present embodiment, the region of only the wide-width circumferential cord layer 21a in which the wide-width circumferential cord layer 21a and the narrow-width circumferential cord layer 21b do not overlap with each other) on each side in the tire width direction of the high-rigidity region and in which the rigidity in the tire circumferential direction per unit width in the tire width direction is low.

Even among tires for passenger vehicles, in a tire having a large inclination angle (30° or more) with respect to the tire circumferential direction of the cord of the inclined belt layer, in a high frequency region of 400 Hz to 2 kHz, the tread surface tends to have a shape that largely vibrates uniformly in primary, secondary, tertiary, etc., vibration modes in a sectional direction, and thus, a large noise emission is generated. Therefore, locally increasing the rigidity in the circumferential direction of the width direction central portion of the tread, makes the width direction central portion of the tread less likely to expand in the tire radial direction, and thus, the noise emission is reduced.

By having the above configuration, the pneumatic tire 20 can improve the generation of noise. The improvement of the noise mode is a difficult effect to obtain if the rigidity of the second circumferential cord layer 15 is too large, but the modulus of elasticity of the second circumferential cord layer 15 is set lower than the modulus of elasticity of the first circumferential cord layer 14 (second circumferential cord layer 15<first circumferential cord layer 21), thus, the improvement effect of the vibration mode can be easily obtained.

Figure 2B:
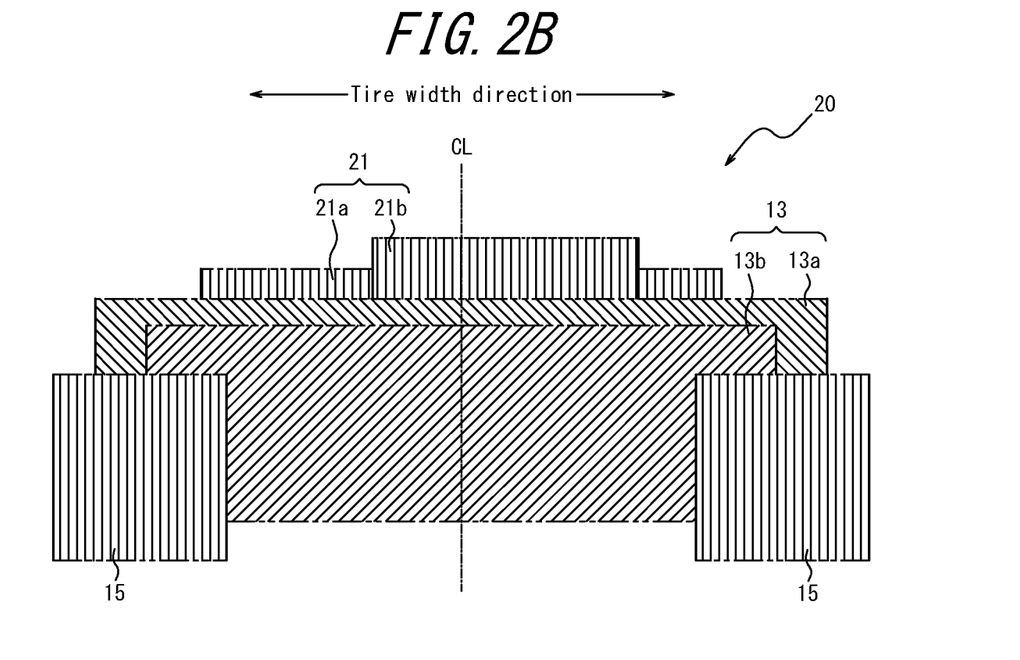
FIG. 2B is a plan view similar to FIG. 2A illustrating another example.

In the pneumatic tire 20, the narrow-width circumferential cord layer 21b may be arranged asymmetrically relative to the tire equator CL.

As illustrated in FIG. 2B, the narrow-width circumferential cord layer 21b is not the same but is different than the width in the tire width direction of each shoulder region of both ends in the tire width direction of the narrow-width circumferential cord layer 21b, and is configured so that the narrow-width circumferential cord layer 21b is arranged asymmetrically with respect to the tire equator CL as seen in the tire widthwise section (in the present embodiment, shifted rightward in the drawing). Namely, the high-rigidity region of the first circumferential cord layer 21 is arranged asymmetrically to the tire width direction with respect to the tire equator CL. Therefore, as stated above, as a result of not only suppressing the amplitude of the vibration mode which causes the noise emission, but also by separating the vibration mode into two vibration modes, the peak level of the sound is reduced more effectively, thus, it is possible to further reduce the noise emission generated from the tire, and the noise can be further improved.

In this way, the tire of the present disclosure in which the peak level of the sound is reduced by decreasing the amplitude of the vibration generated in the tire and separating the amplitude into different modes can reduce the noise emission generated from the tire regardless of the other tire configurations, for example, the size of the cord angle of the inclined belt layer.

More specifically, for example, in the tire in which the cord angle is 30° or more with respect to the tire circumferential direction of the inclined belt layer 13, since the inclined belt layer 13 is in a deformation mode in which it vibrates uniformly, the noise emission tends to be particularly large, and the deformation mode in which the inclined belt layer 13 vibrates uniformly can be improved by applying the aforementioned configuration of the present disclosure, in particular, by providing the center region having a comparatively high rigidity at a predetermined ratio. Furthermore, by making the width in the tire width direction of the shoulder region having a relatively low rigidity different on one side from the other side, it is possible to separate the vibration mode and reduce the generation of the noise emission.

Similarly, even in a tire in which the cord angle of the inclined belt layer 13 is less than 30°, the reduction effect of the noise emission can be obtained by applying the configuration of the present disclosure.

Third Embodiment

Figure 3A:
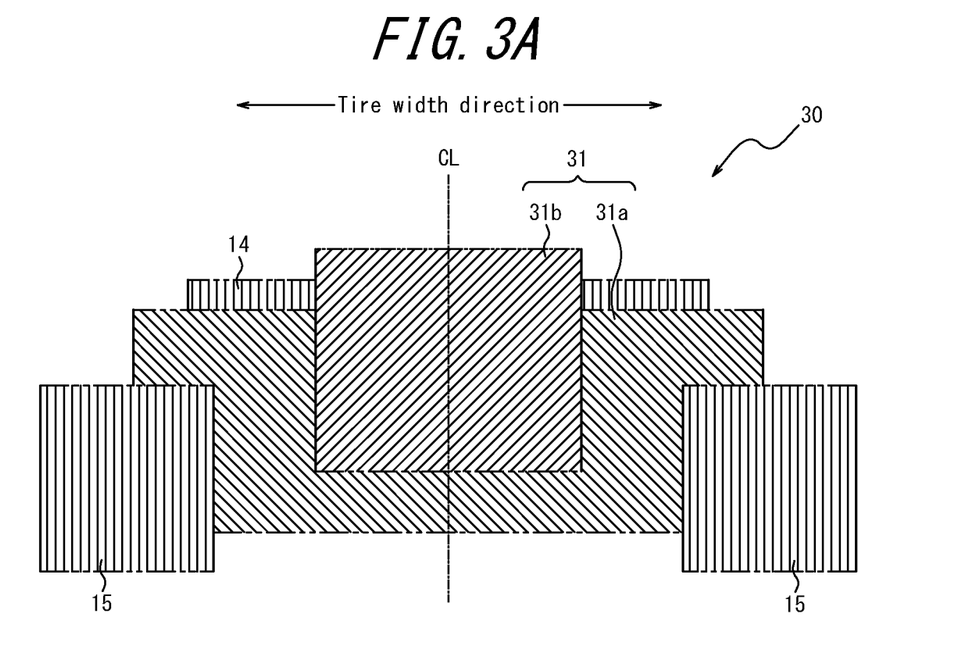
FIG. 3A is a schematic view of a pneumatic tire according to a third embodiment of the present disclosure, and is a plan view of the layer structure in the tread portion.

A pneumatic tire 30 according to a third embodiment of the present disclosure, other than the inclined belt layer 13 being configured by two inclined belt layers 31a, 31b having largely different widths in the tire width direction has the same structure and operation as the pneumatic tire 10 according to the aforementioned first embodiment.

As illustrated in FIG. 3A, in the present embodiment, the pneumatic tire 30 comprises an inclined belt layer 31 that is arranged outward in the tire radial direction of the first circumferential cord layer 14 and that is formed by the wide-width inclined belt layer 31a having a relatively wide width in the tire width direction and the narrow-width inclined belt layer 31b having a relatively narrow width in the tire width direction, where the wide-width inclined belt layer 31a and the narrow-width inclined belt layer 31b have largely different widths in the tire width direction. The narrow-width inclined belt layer 31b has a width in the tire width direction which is about 0.5 times the width in the tire width direction of the wide-width inclined belt layer 31a, and the wide-width inclined belt layer 31a and the narrow-width inclined belt layer 31b both have their tire width direction centers arranged on the tire equator CL (refer to FIG. 3A).

Therefore, the inclined belt layer 31 has a center region which is the center portion of the width in the tire width direction which includes at least the tire equator CL as a two layer structure of the wide-width inclined belt layer 31a and the narrow-width inclined belt layer 31b, and makes the rigidity in the tire circumferential direction of any portion of the center region higher than the rigidity in the tire circumferential direction of any portion of both shoulder regions adjacent to the center region. Namely, the inclined belt layer 31 has a high-rigidity region (in the present embodiment, the region in which the wide-width inclined belt layer 31a and the narrow-width inclined belt layer 31b overlap with each other) which includes the tire equator CL and in which the rigidity in the tire circumferential direction per unit width in the tire width direction is high, and a low-rigidity region (in the present embodiment, the region of only the wide-width inclined belt layer 31a in which the wide-width inclined belt layer 31a and the narrow-width inclined belt layer 31b do not overlap with each other) on each side in the tire width direction of the high-rigidity region and in which the rigidity in the tire circumferential direction per unit width in the tire width direction is low.

By locally increasing the rigidity in the tire circumferential direction of the width direction central portion of the tread 16 in the same manner as the case of the pneumatic tire 20 according to the aforementioned second embodiment, the width direction central portion of the tread 16 is less likely to expand in the tire radial direction, and thus, the noise emission is reduced. In this way, in the tire of the present disclosure, both the rolling resistance performance and the noise performance can be achieved.

By having the above configuration, the pneumatic tire 30 can improve the generation of noise. The improvement of the noise mode is a difficult effect to obtain if the rigidity of the second circumferential cord layer 15 is too large, but the modulus of elasticity of the second circumferential cord layer 15 is set lower than the modulus of elasticity of the inclined belt layer 13 (second circumferential cord layer 15<the inclined belt layer 31), thus, the improvement effect of the vibration mode can be easily obtained.

Figure 3B:
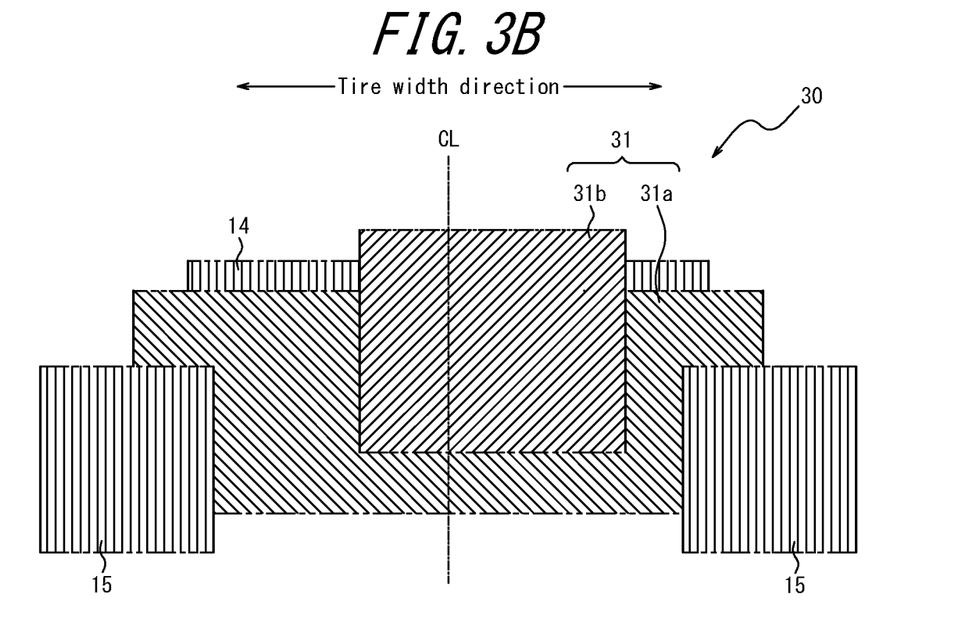
FIG. 3B is a plan view similar to FIG. 3A illustrating another example.

In the pneumatic tire 30, the narrow-width inclined belt layer 31b may arranged asymmetrically relative to the tire equator CL.

As illustrated in FIG. 3B, in the narrow-width inclined belt layer 31b, the width of each shoulder region on each end in the tire width direction of the narrow-width inclined belt layer 31b is not the same but is different in the tire width direction, and the narrow-width inclined belt layer 31b is configured so that it is arranged asymmetrically with respect to the tire equator CL as seen in the tire widthwise section (in the present embodiment, shifted rightward in the drawing). Namely, the high-rigidity region of the inclined belt layer 31 is arranged asymmetrically in the tire width direction with respect to the tire equator CL. Therefore, as stated above, as a result of not only suppressing the amplitude of the vibration mode which causes the noise emission, but also by separating the vibration mode into two vibration modes, the peak level of the sound is reduced more effectively, thus, it is possible to further reduce the noise emission generated from the tire, and the noise can be further improved.

In this way, the tire of the present disclosure in which the peak level of the sound is reduced by decreasing the amplitude of the vibration generated in the tire and separating the amplitude into different modes can reduce the noise emission generated from the tire regardless of the other tire configurations, for example, the size of the cord angle of the inclined belt layer.

More specifically, for example, in the tire in which the cord angle is 30° or more with respect to the tire circumferential direction of the inclined belt layer 13, since the inclined belt layer 13 is in a deformation mode in which it vibrates uniformly, the noise emission tends to be particularly large, and the deformation mode in which the inclined belt layer 13 vibrates uniformly can be improved by applying the aforementioned configuration of the present disclosure, in particular, by providing the center region having a comparatively high rigidity at a predetermined ratio. Furthermore, by making the width in the tire width direction of each shoulder region having a relatively low rigidity different on one side from the other side, it is possible to separate the vibration mode and reduce the generation of the noise emission.

Similarly, even in a tire in which the cord angle of the inclined belt layer 13 is less than 30°, the reduction effect of the noise emission can be obtained by applying the configuration of the present disclosure.

Note that, in each of the aforementioned pneumatic tires 10, 20, 30, the high-rigidity region (in the present embodiment, the region in which the wide-width inclined belt layer and the narrow-width inclined belt layer overlap with each other) of the inclined belt may have a lower negative ratio in the ground contact width of the tread 16 than the low-rigidity region (in the present embodiment, the region of only the wide-width inclined belt layer) of the inclined belt. Therefore, the tread land portion rigidity can be balanced to improve uneven wear performance. Further, the high-rigidity region (in the present embodiment, the region in which the wide-width inclined belt layer and the narrow-width inclined belt layer overlap with each other) of the inclined belt may have a higher negative ratio in the ground contact width of the tread 16 than the low-rigidity region (in the present embodiment, the region of only the wide-width inclined belt layer) of the inclined belt. As a result, the dampening of the vibration mode is further improved and noise performance can be further improved.

Herein, "the ground contact width of the tread" indicates the maximum width of a surface where the tire surface comes into contact with the ground in a state in which the maximum load (maximum load capability) for a single wheel in an applicable size in accordance with the aforementioned standard and the air pressure corresponding to the maximum load are applied, i.e., the maximum straight distance in the tread width direction of the tread surface, and the "negative ratio" indicates the ratio of the area of the groove with respect to the area of the tread surface.

In the present disclosure, when the tire internal pressure is set to 250 kPa or more, the sectional width SW and the outer diameter OD of the tire preferably satisfy the relational expression: $OD \geq -0.0187 \times SW^2 + 9.15 \times SW - 380$. The reason is that the drag coefficient (Cd value) and the rolling resistance value (RR value) can be reduced to improve the fuel efficiency. Further, the tire is preferably used as a passenger vehicle pneumatic radial tire.

REFERENCE SIGNS LIST 10, 20, 30 . . . pneumatic tire,
11 . . . bead portion,
12 . . . carcass,
13, 31 . . . inclined belt,
13a, 31a . . . wide-width inclined belt layer,
13b, 31b . . . narrow-width inclined belt layer,
14, 21 . . . first circumferential cord layer,
21a . . . wide-width circumferential cord layer,
21b . . . narrow-width circumferential cord layer,
15 . . . second circumferential cord layer,
16 . . . tread,
CL: tire equator

The invention claimed is:

1. A pneumatic tire comprising a carcass toroidally extending between a pair of bead portions, at least one inclined belt layer which is arranged outward in the tire radial direction of a crown portion of the carcass through a tire equator and having a cord having an inclination angle of 30° or more with respect to the tire circumferential direction, and a tread arranged outward in the tire radial direction of the inclined belt layer, and comprising
 a first circumferential cord layer arranged inward in the tire radial direction of the inclined belt layer and having a cord extending along the tire circumferential direction, and,
 a second circumferential cord layer which is arranged outward in the tire radial direction so as to cover only a tire width direction end portion of the inclined belt layer, having a cord extending along the tire circumferential direction, and where X is defined as $X = Y \times n \times m \times d$, Y is the Young's modulus (GPa) of the cord, n is the number of cords implanted (cords/50 mm), m is the number of circumferential cord layers, and d is the cord diameter (mm), X of the second circumferential cord layer is smaller than X of the first circumferential cord layer;
 wherein the first circumferential cord layer has a high-rigidity region which includes the tire equator and a low-rigidity region on each side in the tire width direction of the high-rigidity region; the rigidity in the tire circumferential direction per unit width in the tire width direction in the high-rigidity region is higher than the rigidity in the tire circumferential direction per unit width in the tire width direction in the low-rigidity region; and the high-rigidity region has higher rigidity than a rigidity of any other regions positioned outward in the tire width direction with respect to the high-rigidity region;
 when a tire internal pressure is set to 250 kPa or more, a sectional width SW and an outer diameter OD of the tire satisfy the relational expression: $OD \geq -0.0187 \times SW^2 + 9.15 \times SW - 380$;
 wherein the first circumferential cord layer and the second circumferential cord layer are spiral layers; and
 wherein cords of the first circumferential cord layer and cords of the second circumferential cord layer are straight.

2. The pneumatic tire according to claim 1, wherein the high-rigidity region of the first circumferential cord layer is arranged asymmetrically in the tire width direction with respect to the tire equator.

3. The pneumatic tire according to claim 2, wherein the inclined belt layer has a high-rigidity region and a low-rigidity region on each side in the tire width direction of the high-rigidity region; and the rigidity in the tire circumferential direction per unit width in the tire width direction of the high-rigidity region is higher than the rigidity in the tire circumferential direction per unit width in the tire width direction of the low-rigidity region.

4. The pneumatic tire according to claim 3, wherein X of the second circumferential cord layer is 50% or less of X of the first circumferential cord layer.

5. The pneumatic tire according to claim 2, wherein X of the second circumferential cord layer is 50% or less of X of the first circumferential cord layer.

6. The pneumatic tire according to claim 1, wherein the inclined belt layer has a high-rigidity region and a low-rigidity region on each side in the tire width direction of the high-rigidity region; and the rigidity in the tire circumferential direction per unit width in the tire width direction of the high-rigidity region is higher than the rigidity in the tire circumferential direction per unit width in the tire width direction of the low-rigidity region.

7. The pneumatic tire according to claim 6, wherein the high-rigidity region of the inclined belt layer is arranged asymmetrically in the tire width direction with respect to the tire equator.

8. The pneumatic tire according to claim 7, wherein X of the second circumferential cord layer is 50% or less of X of the first circumferential cord layer.

9. The pneumatic tire according to claim 6, wherein X of the second circumferential cord layer is 50% or less of X of the first circumferential cord layer.

10. The pneumatic tire according to claim 1, wherein X of the second circumferential cord layer is 50% or less of X of the first circumferential cord layer.

\* \* \* \* \*